INVENTOR.
EMERY K. CHAFFEE
BY
Merchant & Gould
ATTORNEYS

United States Patent Office 3,521,402
Patented July 21, 1970

3,521,402
METHOD OF CONDITIONING CROP SEEDS
Emery K. Chaffee, Twin Falls, Idaho, assignor to Northrup, King & Co., Minnneapolis, Minn., a corporation of Minnesota
Filed Oct. 23, 1967, Ser. No. 677,298
Int. Cl. A23i 1/20; A01c 1/00
U.S. Cl. 47—58                                   10 Claims

ABSTRACT OF THE DISCLOSURE

A method of protecting seed germination by reducing susceptibility to mechanical injury. Water is added to an inert, water absorbent, granular material in a known ratio by weight. The moist material is then added to a quantity of relatively dry crop seeds, such as bean seeds, in an amount sufficient to raise the moisture content of the crop seeds to a desired level to toughen the seed.

BACKGROUND OF THE INVENTION

Field of the invention

This invention relates generally to a method of protecting crop seed germination and more particularly relates to a method of toughening the seed by increasing the moisture content of the seed, to reduce damage to the seed caused by handling and processing.

Description of the prior art

The present invention is particularly concerned with maintaining the quality of garden bean seeds from the time the seeds are harvested to the time that they are subsequently planted. The seed industry has known for many years that a major cause of poor bean seed germination has been the presence of cracked or otherwise damaged seeds in the seed lot being planted. Typically, the damage has been caused by handling, resulting in injury to the seed. Seeds that are damaged or cracked will lose their viability within a short time, or if they do germinate, will often produce weak, stunted seedlings. Therefore, if physical damage to the seeds can be prevented, a better rate of germination and stronger plants will result.

Damage to the seeds can occur at several different stages. Damage may occur during the harvesting operation, during subsequent handling and processing, and even during the planting operation. Those working with the problem have known for some time that more damage will occur if the seeds are too dry. Most seeds, and especially bean seeds, become very brittle when dry and tend to crack even if handled very carefully. Conversely, if the moisture content of the seeds is sufficiently high, the seed will be toughened and less susceptible to damage. When harvesting bean seed in the field it is desirable to have as high a moisture as possible while at the same time providing good harvestability and proper storage moisture.

The prior art discloses that attempts have been made to increase the bean seed moisture content prior to harversting by spraying the windrows in the field with water. The beans, still in the pods, absorb a certain amount of this water, thereby toughening the seed.

As the bean seeds are harvested, they are carried by a truck to an elevator or other storage area where they are passed through an aspirator to remove dirt and chaff. The seeds are then placed in temporary storage, usually lasting from sixty to ninety days. During this period of temporary storage, the beans are normally held in open top seel boxes approximately four feet high, four feet wide, and four feet deep. As time and facilities become available, the beans are removed from temporary storage and are processed to make them suitable for sale as seed for planting. The seeds are screened, cleaned, and treated. In addition, splits and discolored seeds are removed. The processed seeds are then placed in bags for sale.

It is well known that this processing causes considerable damage to the bean seeds, especially if they are too dry. Therefore, attempts have also been made to increase the bean seed moisture content during this critical processing period. For example, beans have been temporarily stored in basements or other areas having a high humidity in an attempt to increase their moisture content. However, if the beans absorb sufficient moisture to raise their moisture content to above sixteen or seventeen percent, the beans will heat or mold during storage. Therefore, if this method is to be successful at all, both the temperature and humidity must be carefully controlled to insure that no damage results. Because of these problems, this method has not achieved a significant degree of acceptance in commercial operations.

The prior art also shows that attempts have been made to add damp sawdust to the beans during the period of temporary storage. Although beans will absorb moisture from the damp sawdust, many problems have also arisen with this method. For one thing, sawdust has an inherent moisture equilibrium level that must be exceeded before the moisture will be available to the beans. Therefore, a relatively high moisture level is required in the sawdust to insure that moisture is available for the beans. Fungi often grows on this very moist material which may reduce germination.

Since the sawdust retains a certain amount of moisture under all conditions, it is also difficult to control the amount of moisture that is available for the seeds. Since the range of useful moisture levels in the seed is so narrow, the ability to control the resulting level in the seed is an extremely important part of any method that is selected. Another problem with sawdust is that it often contains toxic organic materials such as resin that damage or discolor the seed during storage. Further, where damp sawdust is used, there is always the danger of spontaneous combustion.

The prior art discloses that those working in the seed industry have known for many years that more damage will occur, during processing, to crop seeds having a low moisture content. Many attempts have been made to overcome this problem by adding moisture to the seeds during various stages of harvesting and processing. None of these attempts has resulted in methods that have been adopted by the industry, however, because of the problems outlined above.

SUMMARY OF THE INVENTION

The present invention provides a simple and effective method of controllably raising the moisture content of relatively dry crop seeds and thereby reduce processing damage. In practicing the present invention, a predetermined amount of water is added to a known amount of an inert, water absorbent, granular material. This damp material is then added to a quantity of dry seed in sufficient amounts to increase the moisture content of the seed to a desired level suitable for storage and processing. By this method, a controlled amount of moisture can be added so that the seeds will be neither too dry nor too moist. Further, the material is nontoxic and is not susceptible to spontaneous combustion. Although I am mainly concerned with improving bean seed germination, the present method can also be used with other crop seeds such as seed corn and wheat.

DESCRIPTION OF THE PREFERRED EMBODIMENT

In the process of my invention, a moist material is added to the bean seeds during temporary storage to raise the moisture content of the seeds to a selected level to reduce damage to the seeds during subsequent handling and processing. I have discovered that a material known as perlite is especially desirable for use in this method. Perlite is made from a porous volcanic rock. This rock, after being mined, is heated to a very high temperature to expand the moisture naturally carried by the rock. The rock literally explodes and shatters into relatively small particles or granules. These granules are then screened to remove undersized and oversized particles. Preferably, the resulting particles are smaller than bean seeds so that they can be easily screened from the bean seeds before planting.

Perlite is a very desirable material for use in this process, for several reasons. First, it is naturally porous and capable of holding a large amount of water in comparison with its own weight. Perlite can also be dried out completely before use so that the amount of water added can be closely controlled. Further, perlite does not have a significant inherent moisture equilibrium level and almost all of the water absorbed by the perlite is available for absorption into the bean seeds.

Perlite is also an inert material and is therefore completely nontoxic with respect to the seeds. Since perlite is a hard, granular material, it can be thoroughly mixed with the bean seeds during storage so that the moisture is evenly distributed throughout the seed lot. Further, perlite will retain its granular shape during storage.

In practicing the present invention, a known quantity of water is added to a known quantity of perlite. The damp perlite is then added to the beans in a known ratio before the beans are placed in storage. Preferably, the beans being brought in from the field are first sent through an aspirator to remove dirt and chaff. The beans are conveyed from the aspirator on an endless belt conveyor that carries the beans to the storage boxes. I have successfully added damp perlite to the beans on the conveyor by means of a screw-type conveyor mounted to discharge the damp perlite onto the surface of the beans on the first conveyor. As the dry perlite is being carried through the screw conveyor, water is added by means of water sprays projecting into the conveyor. Since the quantity of bean seeds being moved by the first conveyor is known, I can regulate the addition of dry perlite and water such that the correct amount of moisture is added to the beans. The water is of course completely absorbed by the perlite before the perlite is deposited over the surface of the beans on the first conveyor.

Figure 1:
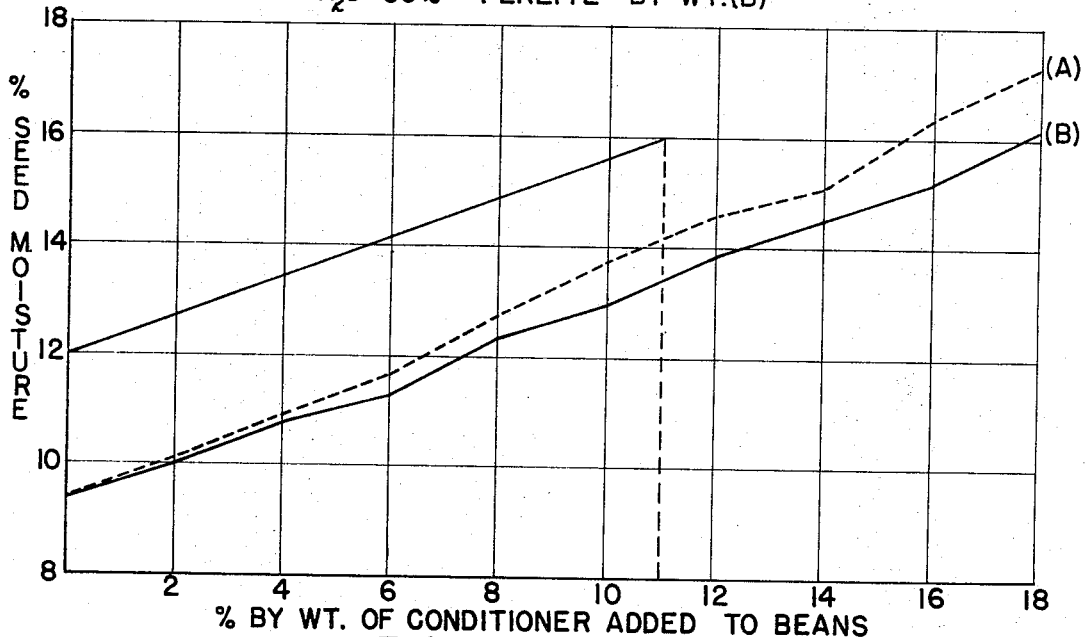
FIG. 1 is a graph showing bean seed moisture content plotted against the percent by weight of conditioner added to the bean seeds.

Referring now to FIG. 1, there is disclosed a graph of seed moisture content plotted against the percentage by weight of conditioner added. The lower solid line represents the effect of adding a conditioner comprising fifty percent water and fifty percent perlite by weight. The dashed line represents the effect of adding a conditioner comprising sixty percent water and forty percent perlite by weight. The graph was plotted from information obtained from actual tests conducted on a variety of garden beans known as Sprite. As appears from the graph, the original moisture content of the bean seeds was 9.3 percent. The basic seed lot was divided into a number of different samples to which differing amounts of conditioner were added. For example, when ten percent by weight of conditioner B was added to the original mixture, the moisture content of the bean seeds was raised to approximately 12.9 percent. When the same amount of conditioner A was added to a similar sample, the moisture content was raised to 13.7 percent.

The tests that were conducted indicated that for a given variety of bean seeds, the effect of adding a known amount of conditioner could be accurately predicted. Further, the tests indicated that regardless of the original moisture content of the seeds, the slope of the curve representing moisture increase would remain the same. For example, let us assume that the original sample contained twelve percent moisture and that it was desired to add sufficient moisture to raise the moisture content of the lot to sixteen percent. It is further assumed that the beans are of the Sprite variety and that conditioner B is to be added. Since the slope of the curve remains the same regardless of the original moisture condition of the beans, the first step is to prepare a reference line drawn through the point on the ordinate of the graph representing twelve percent. This line is drawn in parallel with the originally plotted line representing the effect of adding conditioner B. This line is shown on the drawing. The next step is to draw a vertical line through the point at which the first line intercepts the horizontal line representing sixteen percent moisture content. This vertical dashed line is also shown on the drawing. The percent by weight of conditioner B that must be added to raise the moisture content of the lot to sixteen percent is then read from the abcissa, in this case 11.0 percent.

It is necessary in all cases to prepare a chart such as that shown in FIG. 1 for each variety of bean seeds or other seeds to be conditioned. The chart will then remain valid for that variety of seed and will provide an accurate indication of the amount of conditioner that is required to raise the seed to the desired moisture content. If deemed desirable to do so, conditioners having different ratios of water and perlite could be used and corresponding curves plotted.

In each case where the method is carried out, the moisture content of the original seed lot must be determined so that the correct amount of conditioner can be added. Since the process is preferably carried out on a continuous basis by adding conditioner to the beans as they are carried by an endless belt conveyor, some means of regulating the amount of water and perlite added must be provided. The amount of perlite added can be quite simply regulated by the use of a screw-type or vibrator conveyor that runs at a known speed. Either the speed of the conveyor or the amount of perlite added to the conveyor can be regulated to add the correct amount of perlite. In the case of water, the pressure and flow of the water can be regulated to add the proper amount.

Figure 2:
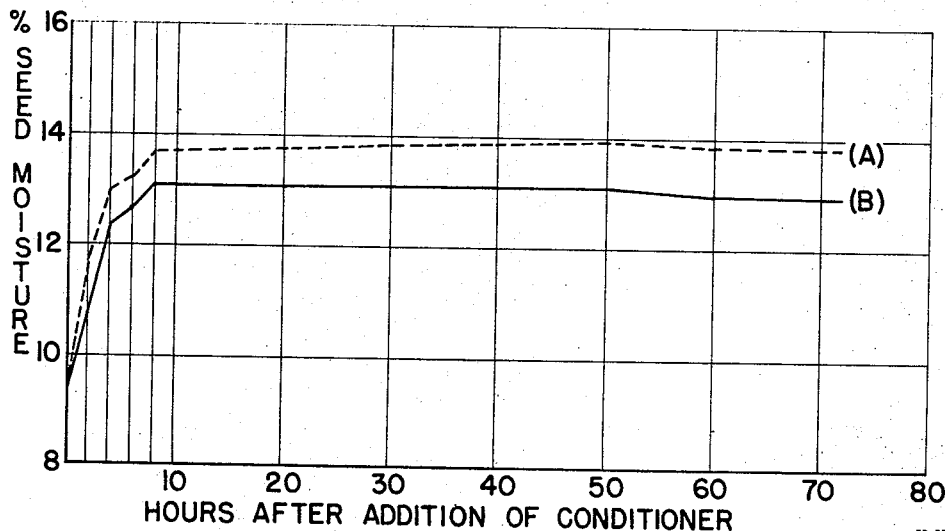
FIG. 2 is a graph of bean seed moisture content plotted against time in hours after addition of the conditioner.

The graph of FIG. 2 shows the time required to add moisture to the bean seeds. Again, curve A represents the addition of a conditioner comprising fifty percent by weight of water and perlite. In both cases, ten percent by weight of conditioner was added to the original bean sample. Again, the original sample had a moisture content of 9.3 percent. The chart indicates that approximately eight hours were required to raise the moisture content to the desired level. After eight hours, virtually no change occurred in the moisture content of the bean seeds. The graph of FIG. 2 thus shows that if a known amount of conditioner is added, the moisture content will level off at a desired, predictable, and controllable level. As previously mentioned, the conditioners are normally added to and mixed with the seeds prior to the time they are placed in temporary storage. I have found that it is not necessary to completely seal the containers for the seeds during storage. Using this method, the moisture content of seeds stored in the usual open top steel box will remain at a desired level for at least ninety days. If it is necessary to store the seeds for a longer period of time, then a sealed container could be utilized to prevent loss of moisture. By means of the present invention, the seeds removed from storage are at a moisture level of from twelve to fifteen percent, thereby minimizing physical damage to the seeds during the various processing steps. Usually, the perlite is removed by screening prior to the time the bean seeds are bagged for sale. However, if further protection is believed to be desirable or necessary, the seeds that are ready for planting can be packaged with damp perlite to maintain a proper moisture level until the seeds are planted. The present invention can therefore be utilized at any stage of processing, except at the actual harvesting operation itself.

The moisture added to the beans by this method will not damage the beans unless of course the moisture level is raised to an undesirably high level. This will not occur, however, as long as the process is carried out in the proper manner. The perlite itself has absolutely no effect on the bean seeds since it is a completely inert, nontoxic material. By use of the present invention, the moisture content of any given seed lot can be raised a desired amount and maintained at that level for an indeterminate period. The seeds are thereby toughened so that subsequent handling of the seeds will be less likely to cause cracking or other physical damage. Since undamaged seeds will have a higher germination than cracked or otherwise damaged seeds, the present invention raises the over-all rate of germination of seed lots to which the process is applied.

I have described herein a preferred embodiment of my inventive process. Since changes in the process may occur to those skilled in the art, which changes do not depart from the inventive concept, I do not intend to be bound by the detailed description of the invention presented herein, but only by the scope and spirit of the appended claims.

What is claimed is:

1. A method of increasing the moisture content of relatively dry crop seeds to reduce processing damage, comprising the steps of:
    (a) adding water to an inert, inorganic water absorbent, granular material; and
    (b) adding said water carrying material to a dry seed lot in sufficient quantity to increase the moisture content of said seed lot to a desired level suitable for storage, processing and planting.

2. The method of claim 1 wherein said granular material is a porous volcanic rock heated to a high temperature to shatter the rock into relatively small, granular particles.

3. The method of claim 2 wherein said granular particles are screened to remove all particles above and below a selected range of particle sizes.

4. The method of claim 1 wherein said crop seeds are bean seeds.

5. The method of claim 1 wherein said water and granular material are combined in approximately equal amounts by weight.

6. The method of claim 1 wherein the weight of water carried by said granular material is greater than the weight of said granular material.

7. A method of reducing physical injury of bean seeds during processing to protect germination, comprising the steps of:
    (a) adding a predetermined amount of water to a predetermined amount of an inert, inorganic water absorbent, granular material; and
    (b) adding said water carrying material to a dry bean seed lot in sufficient quantity to increase the moisture content of said seed lot to a desired level suitable for storage, processing and planting.

8. The method of claim 7 wherein said granular material is perlite.

9. The method of treating garden bean seeds comprising the steps of;
    (a) mixing water with an inert, inorganic water absorbent, granular material; and
    (b) mixing the moist granular material with garden bean seeds in a quantity sufficient to raise the moisture content of said garden bean seeds to a desired level.

10. Processes of claim 9 wherein said granular material is perlite and the moist perlite contains approximately 50% water and 50% perlite by weight.

References Cited

UNITED STATES PATENTS 2,957,828  10/1960  Mansfield _____ 252—378

FOREIGN PATENTS 835,549  12/1938  France.

OTHER REFERENCES

"Readers' Questions Answered," Horticulture, October 1956, vol. XXXIV, No. 10, p. 504 relied on.

"How To Store Summer Bulbs," Horticulture, October 1964, vol. XLII, No. 10, p. 37 relied on.

ROBERT E. BAGWILL, Primary Examiner

U.S. Cl. X.R.

99—98; 252—378